APPARATUS FOR ATTACHING LEADS TO CRYSTALS

Filed Aug. 27, 1958 3 Sheets-Sheet 1

INVENTORS
R. S. BRESCKA
R. L. MOORE
H. W. SCHAUFELBERGER
BY W. A. Johnson
ATTORNEY

APPARATUS FOR ATTACHING LEADS TO CRYSTALS

Filed Aug. 27, 1958 3 Sheets-Sheet 2

INVENTORS
R. S. BRESCKA
R. L. MOORE
H. W. SCHAUFELBERGER
By W. A. Johnson
ATTORNEY July 7, 1959 R. S. BRESCKA ET AL 2,894,112

APPARATUS FOR ATTACHING LEADS TO CRYSTALS

Filed Aug. 27, 1958 3 Sheets-Sheet 3

INVENTORS
R. S. BRESCKA
R. L. MOORE
H. W. SCHAUFELBERGER

By

ATTORNEY

United States Patent Office 2,894,112
Patented July 7, 1959

2,894,112

APPARATUS FOR ATTACHING LEADS TO CRYSTALS

Rudolph S. Brescka, Irvington, Robert L. Moore, Elizabeth, and Henry W. Schaufelberger, Union, N.J., assignors to Western Electric Company, Incorporated, New York, N.Y., a corporation of New York Application August 27, 1958, Serial No. 757,612
7 Claims. (Cl. 219—85)

This invention relates to apparatus for mounting leads on electrical components, particularly to apparatus for soldering leads to quartz crystal plates.

In the processing of electrical components, some of which are exceedingly small, great care must be taken in supporting and aligning the parts for assembly. In the present instance, Phosphor-bronze lead wires, having diameters of approximately .005", with one end of each headed and provided with a quantity of solder surrounding the head, are to be mounted on burnished silver spots fired to opposing faces of quartz-crystal plates approximately ¼" square. The sizes of these parts, that is the crystal plates and lead wires, present problems, not only of careful handling, but more particularly of accurate positioning of the parts and the application of heat for like periods of time to bring about efficient joining of the leads to the parts or quartz-crystal plates.

An object of the present invention, is a solution to these problems in the form of an apparatus for efficiently and accurately mounting solder surrounding headed ends of wire leads to articles such as silver spotted crystals.

In accordance with the object, the invention comprises a nest to support the articles or crystals singly, and to locate selected surfaces thereof in a given plane. A holder for receiving the wires singly, mounted with respect to the nest, is moved between a loading position away from the nest, and a mounting position where a lead wire therein will be held perpendicular to the selected surface, and in engagement with a silver spot on the surface so that a heating element, movable into position over the surface of the crystal and adapted to partially surround the lead adjacent the head, will heat the solder until it melts and heats the silver to a wetting temperature for the solder.

More specifically, the nest has a cavity of an inverted pyramidal contour to receive square articles or crystals and to assure location of the upper surface of each article in a plane perpendicular to the lead, regardless of variations in the sizes of the articles or crystals. Also, a time control unit is responsive to the movements of the heating element into and away from the mounting position to cause energization of an element, such as a lamp, for predetermined intervals of time indicating termination of both the heating period and a cooling period for each mounting operation.

Other objects and advantages will be apparent from the following detailed description when considered in conjunction with the accompanying drawings, wherein.

Figure 4:
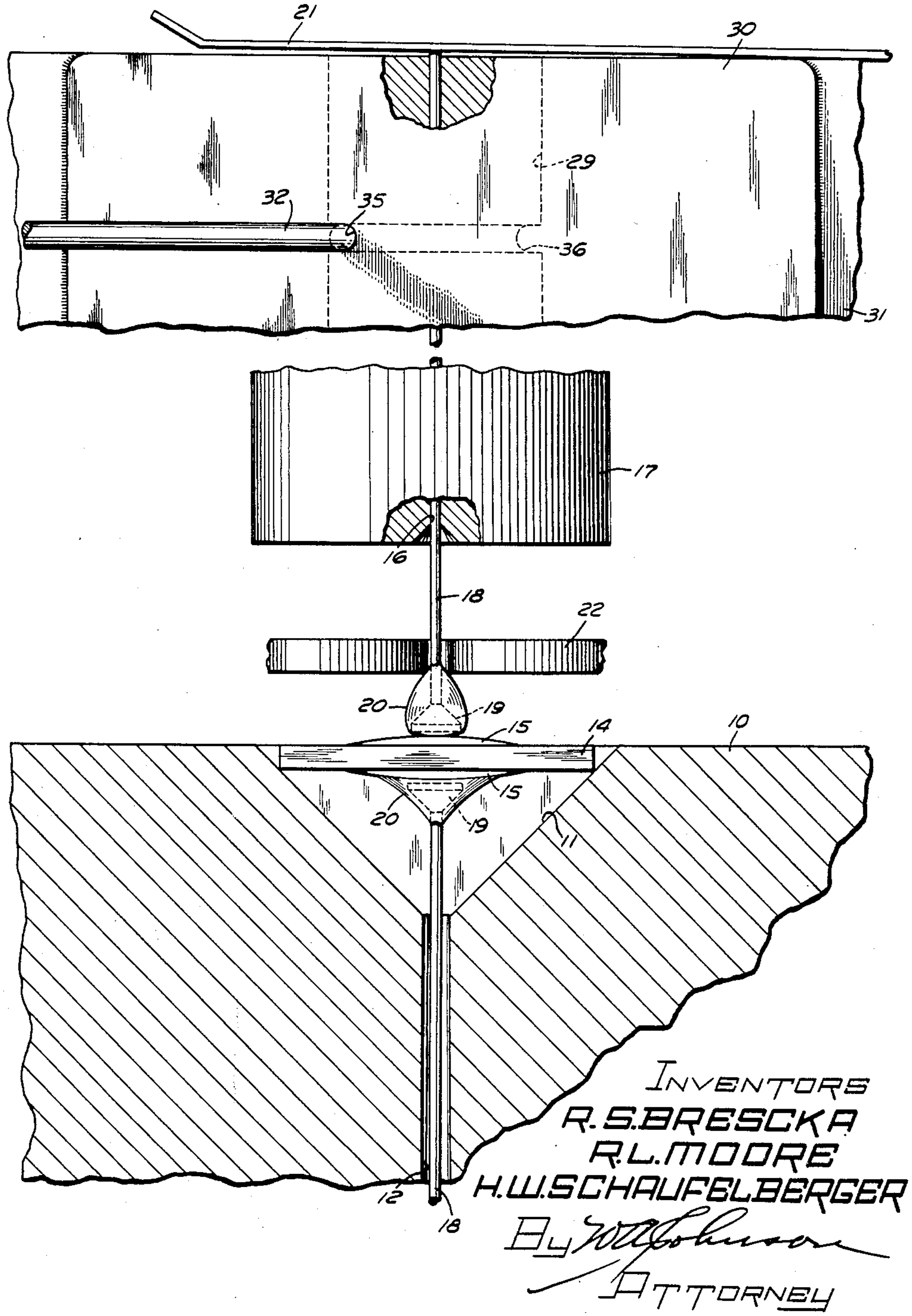
Fig. 4 is an enlarged fragmentary vertical sectional view of portions of the apparatus illustrating the mounting of the lead to the crystal.

Before considering the general features of the apparatus, attention is directed to Fig. 4 which illustrates what is accomplished by the apparatus. In this figure, a nest 10, having a cavity 11 of an inverted pyramidal contour, is positioned above a vertical aperture 12 to receive articles 14. In the present instance, the articles 14 are quartz-crystal plates which are approximately ¼" square and provided with burnished silver spots 15 approximately .040" in diameter fired to each face of the crystal adjacent the centers thereof. The contour of the cavity 11 of the nest 10 is such that regardless of variations in the sizes of the square crystals, the crystals will be centered automatically in the nest, and the upper face will be in a true horizontal plane or in a plane perpendicular to an aperture 16 in a holder 17 for the lead wire 18. Each lead wire 18, in the present instance, is formed of Phosphor-bronze with a head 19, formed at one end thereof, and provided with a quantity of solder 20 before reaching the apparatus. The wire 18 is fed to a holder 17, and frictionally held in the aperture 16. The wire extends completely through the holder and the upper end of the wire engages a spring 21 which serves to apply the necessary force to hold the solder-covered end of the lead wire 18 against the silver spot 15. Before a heating element 22 is moved into position, and before the solder-carrying end of the lead wire is placed on the silver spot, the spot is coated with a layer of rosin alcohol flux. When the heating element 22 is moved into position, it partially surrounds the lead wire to heat the solder to a molten state, and to heat the silver spot until it reaches the effective wetting temperature for solder, at which time the globule of molten solder over the silver spot forms a cone, as illustrated in the previous mounting structure on the undersurface of the crystal 14.

Attention is now directed to the apparatus in general which includes a main frame 25 which supports a table 26 having an aperture 27 in which the nest 10 is mounted. The holder 17 is mounted in an aperture 29 of an enlarged portion 30 of an arm 31, and is removably held in place by a spring 32, one end of which is fixedly mounted at 33 on the arm 31, while a coiled portion 34 normally urges the opposing end into an aperture 35 of the portion 30 where it is positioned in a groove 36 in the holder 17 to removably secure the holder against displacement. The arm 31 is pivotally supported at 38 by a bracket 39, mounted on the table 26. The spring 21 is mounted at 40 on the upper surface of the arm. A handle 41 mounted on the arm 31 is utilized to move the arm manually from a loading position, as indicated in dotted lines in Fig. 1 to the mounting position shown in solid lines therein. The free end of the arm 31 comes to rest on a pin 42 mounted in a bifurcated end of a bracket 43 which is mounted on a table 26.

Figures 2, 3:
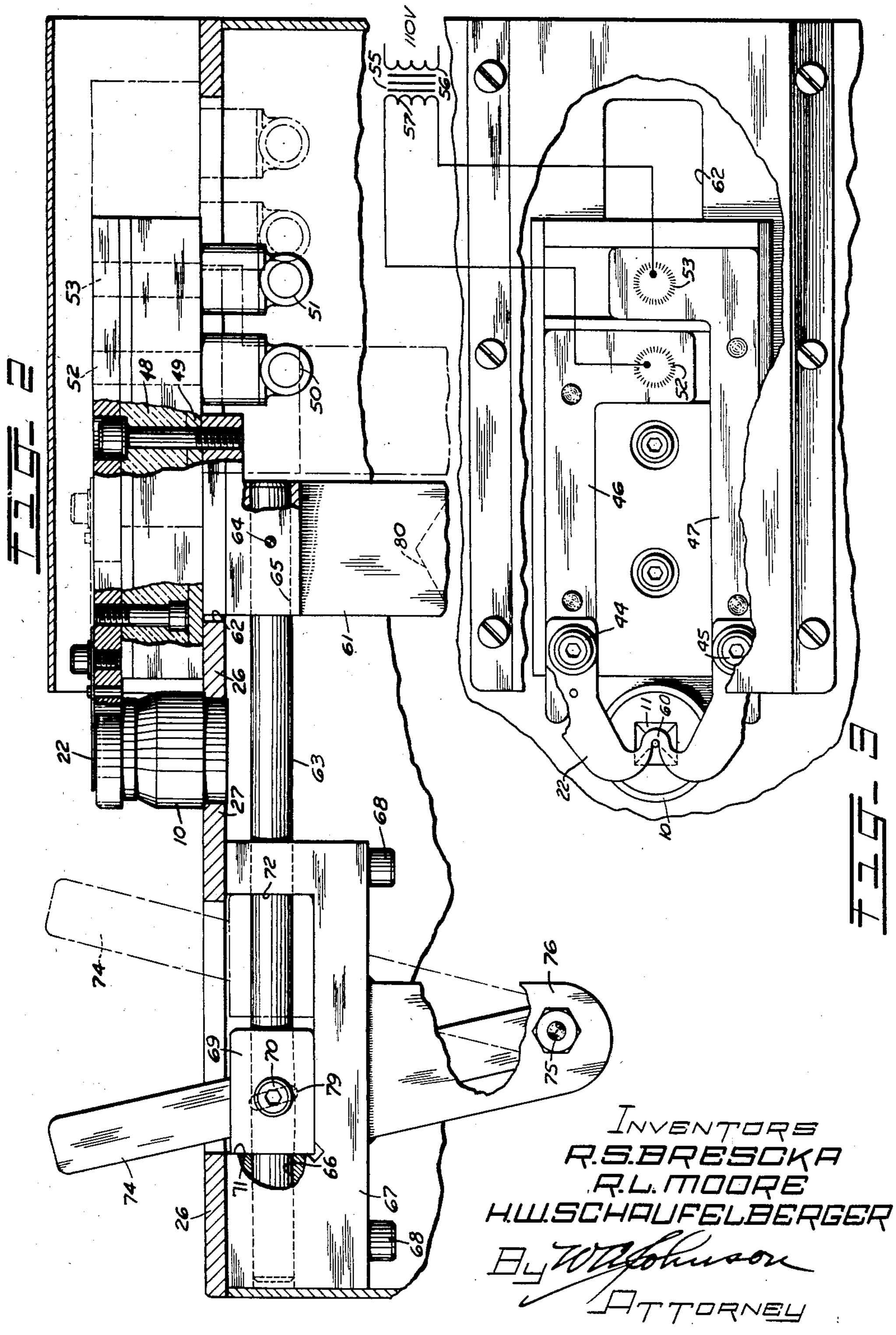
Fig. 2 is a side elevational view of the apparatus, portions thereof being shown in section.
Fig. 3 is a fragmentary top plan view of a portion of the apparatus.

The heating element 22, is of the contour shown generally in Fig. 3, formed of conductive material with the ends mechanically and electrically mounted at 44 and 45 on the bus bars 46 and 47. The bus bars 46 and 47 are mounted in grooves of a dielectric member 48, which is mounted on a carriage 49 supported on the table 26. Terminals 50 and 51 are connected to their respective bus bars 46 and 47 respectively at 52 and 53. The schematic wiring diagram, shown in Fig. 3, illustrates a transformer 55 having its primary winding 56 connected to a conventional 110 volt supply, and its secondary winding 57 connected to the terminals 50 and 51 supplies a low voltage (1 or 2 volts) and 30 to 50 amperes. For the purpose of illustration only, the secondary winding 57 is shown connected to the top connection 52 and 53 of the terminals with the bus bars. Returning to the heating element, attention is directed to the particular shape thereof and the smallest portion 60, which in effect will be the low resistance area of the heating element. The portion 60, when in the forming position shown in Fig. 3, is located above the nest closely adjacent the crystal and substantially surrounds the wire during mounting of the wire on the crystal.

The carriage 49 has a bracket 61 mounted on the under surface thereof and extends downwardly through an elongate aperture 62 in the table 26. The bracket has one end of a rod 63 mounted at 64 in an aperture 65 thereof, the other end extending through apertures 66 (Fig. 1) in the legs of a U-shaped bracket 67 which is mounted beneath and secured at 68 to the table. A slide 69, mounted concentric with the rod 63, is adjustably secured thereto by a screw 70 to determine its location on the rod between stops 71 and 72 which are surfaces of the legs of the U-shaped bracket 67. A lever 74, pivotally mounted at 75 on an extension 76 of the bracket 67, is movable between the two positions shown in broken and solid lines which may be described as the cooling and heating positions. When the lever 74 is in the solid-line position, a pin 78, disposed in an elongate aperture 79 thereof and fixed in the slide 69, has moved the slide with the rod 63 and the carriage 49 to the mounting or heating position where the heating element 22 is positioned as shown in Figs. 2 and 3. When the handle 74 is in the broken-line position, the heating element will be positioned away from the nest.

Figure 1:
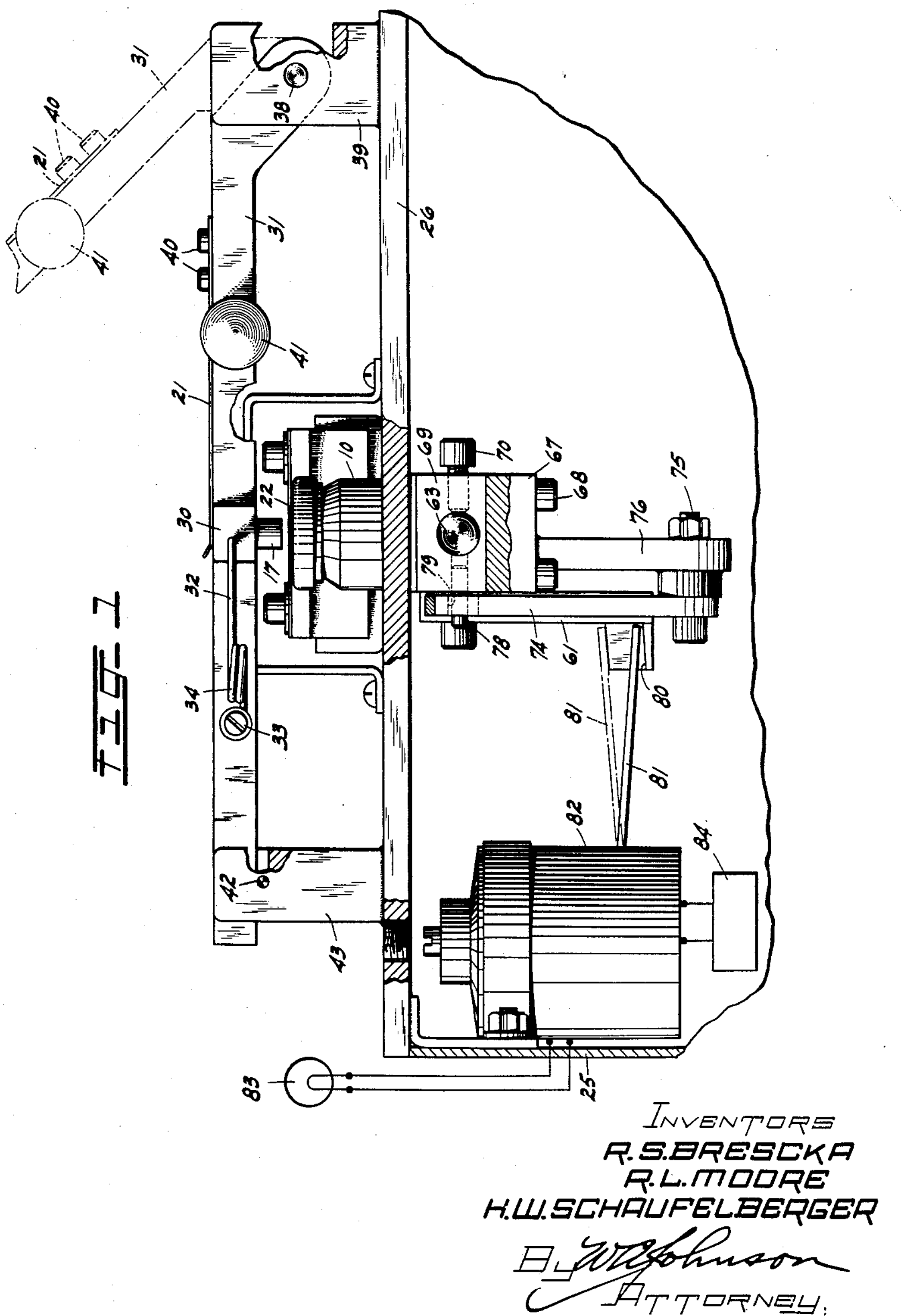
Fig. 1 is a front elevational view of the apparatus, portions thereof being shown in section.

The bracket 61 carries a cam 80 positioned to actuate an arm 81 of a timing unit 82 when the heating element is moved into and out of the mounting position to actuate the unit to cause energization of an indicating element 83 for predetermined periods of time. In the present instance, a source of electrical energy 84 is supplied constantly to the timing unit 52. This unit with the switch arm 81 in the solid-line position, Fig. 1, is normally open or inactive. The unit is adapted, when the switch arm 81 is moved to the broken-line position, to complete a circuit through the indicating element 83 and hold that circuit closed for a predetermined variable length of time which is necessary for the mounting operation. The same thing occurs during the movement of the heating element away from the nest, this movement causing the cam 80 to actuate the switch arm 81, as illustrated in Fig. 1 to cause the unit 82 to function to complete a circuit through the indicating element 83 for the same selected period of time to indicate to the operator, when the lamp goes out, that the connection between the lead and the crystal has cooled sufficiently for removal from the nest.

*Operation*

The operation of the apparatus includes movement of the arm 31 to the loading position where a lead wire 18 is located in the aperture 16 of the holder 17. With the arm in this position a crystal or article 14 is located in the nest 10. The circuit for the heating element 22 is closed at all times during the operation of the apparatus so that the low resistance area 60 is heated to the proper temperature and remains in that condition at all times while the apparatus is in operation. As soon as the lead wire and the crystal plate are in position, the arm is lowered to the position shown in solid lines in Fig. 1 and at that time, the lever 74 is moved from the broken-line position, Fig. 2, to the solid-line position, causing the cam 80 to operate the switch arm 81 of the unit 82 energizing indicating element 83 at the time the heating element 22 is brought into heating position. At this time, the heating element 22, substantially or effectively surrounding the lead wire adjacent the deposit 20 of the solder of the headed end 19, causes radiant energy of the portion 60 of the element to heat the silver spot 15 at almost uniform rate from all directions. The same is true regarding the solder 20 but with the solder the application of the radiant heat is not so greatly important as regards to the silver spot in that the solder wil melt on the wire, but will remain in a globule on the headed end of the wire until the silver spot reaches the effective wetting temperature for the solder. At that time, the solder will flow out over the silver spot to form a solder cone and thereby, through the joining of the solder and the silver the lead wire is structurally mounted on and electrically connected to the face of the crystal. It is not necessary for the operators to determine visually when this action occurs owing to the fact that this interval of time is determined when setting up the apparatus and the unit 82 is adjusted accordingly. There is an important interval which must take place prior to the opening or movement of the handle or arm 31 into the loading position. This is the interval necessary for the cooling of the connection between the lead 18 and the crystal 14. It has been found that the same interval of time required for the mounting of the lead wire is neded for the cooling of the connection. Therefore, when the carriage 49, with the heating element 22 is moved to the cooling position away from the nest, the cam 80 operates the switch arm 81 to operate the timing unit 82 to energize the element 83. Then the element 83 is de-energized by the unit 82 the solder has solidified and the article cooled sufficient for movement with the arm 31 into the loading and unloading position. After the partially completed crystal, with one lead mounted thereon, is inserted into the cavity 11 of the nest 10, as shown in Fig. 4, another wire 18 with its headed end 19 surrounded with solder 20 may be mounted in the holder 17 and lowered into position adjacent the other spot 15 of silver which also is provided with a layer of rosin alcohol flux prior to movement of the heating element into the mounting or heating position. Each half cycle of the apparatus is controlled by the unit 82 not only during application of heat to mount the wire, but during the cooling periods when the element 83 is energized for controlled periods of time by the unit 82 when the switch arm 81 is actuated by the cam 80.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for mounting solder surrounded headed ends of wire leads to deposits of silver on surfaces of crystals comprising a nest to support the crystals singly and to locate selected surfaces thereof in a given plane, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder.

2. An apparatus for mounting solder surrounded headed ends of wire leads to deposits of silver on surfaces of crystals comprising a nest to support the crystals singly and to locate selected surfaces thereof in a given plane, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder, an energizable indicator, and a timing actuable by movement of the heating element adjacent the crystal in the nest to energize the indicator for a period of time necessary for mounting the lead.

3. An apparatus for mounting solder surrounded headed ends of wire leads to deposits of silver on surfaces of crystals comprising a nest to support the crystals singly and to locate selected surfaces thereof in a given plane, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder, an energizable indicator, and a timing unit actuable by movement of the heating element away from the nest to energize the indicator for a period of time necessary for the metals of the mounting before movement of the holder to the receiving position to remove the crystal from the nest.

4. An apparatus for mounting solder surrounded headed ends of wire leads to deposits of silver on surfaces of crystals comprising a nest to support the crystals singly and to locate selected surfaces thereof in a given plane, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder, the heating element formed with a low resistance portion partially surrounding the lead and positioned so that the radiant energy therefrom heats the solder and the silver deposit at substantially uniform rate for all directions.

5. An apparatus for mounting solder surrounded headed ends of wire leads to deposits of silver on surfaces of crystals comprising a nest to support the crystals singly and to locate selected surfaces thereof in a given plane, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder, and a spring applying longitudinal force to the lead toward the silver deposit during heating of the solder and silver.

6. An apparatus for mounting solder surrounded headed ends of wire leads to deposits of silver on surfaces of crystals comprising a nest to support the crystals singly and to locate selected surfaces thereof in a given plane, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder, a carriage for the heating element, means actuable to move the carriage to move the heating element between said positions, an energizable indicator, a timing unit set for predetermined intervals when actuated to control energization of the indicator, and a cam movable with the carriage and positioned to actuate the timing unit, when the heating element is moved into position over the nest to cause the indicator to indicate expiration of a heating period, and to actuate the timing unit when the heating element is moved away from the nest to cause the indicator to indicate the expiration of a heating period.

7. An apparatus for mounting solder surrounded headed ends of wire leads to deposits of silver on surfaces of crystals comprising a nest to support the crystals singly and to locate selected surfaces thereof in a given plane, the nest having a vertical lead receiving aperture centrally disposed therein, and a crystal receiving cavity centrally aligned with the aperture and having surfaces extending outwardly at like angles to jointly support crystals of various sizes in planes perpendicular to the aperture, a holder for receiving the wires singly mounted with respect to the nest for movement between a loading position away from the nest and a mounting position where a lead wire therein will be held perpendicular to the selected surface and in engagement with the silver deposit, a heating element mounted for movement between a position away from the nest to a position over the selected face of the crystal and partially around the lead adjacent the headed end to heat the solder until it melts and to heat the silver to a wetting temperature for the solder.

References Cited in the file of this patent

UNITED STATES PATENTS

| | | |
|---|---|---|
| 2,494,474 | Fermanian et al. | Jan. 10, 1950 |
| 2,602,872 | Ziegler | July 8, 1952 |
| 2,705,768 | Kleimach et al. | Apr. 15, 1955 |